United States Patent
Hunter et al.

(10) Patent No.: US 7,926,124 B2
(45) Date of Patent: Apr. 19, 2011

(54) THERMAL REGULATING AND LOAD BEARING INSERTS FOR WEARABLE AND RELATED ITEMS

(75) Inventors: Robert L. Hunter, Jacksonville, FL (US); Whitney R. Hunter, Jacksonville, FL (US); Stephen A. Gathings, Birmingham, AL (US)

(73) Assignee: Variloft, LLC, Jacksonville, FL (US)

( * ) Notice: Subject to any disclaimer, the term of this patent is extended or adjusted under 35 U.S.C. 154(b) by 0 days.

(21) Appl. No.: 12/619,714

(22) Filed: Nov. 17, 2009

(65) Prior Publication Data
US 2010/0186134 A1 Jul. 29, 2010

Related U.S. Application Data

(60) Provisional application No. 61/148,309, filed on Jan. 29, 2009.

(51) Int. Cl.
*A41D 27/26* (2006.01)
*A41D 27/28* (2006.01)
*A41D 27/02* (2006.01)

(52) U.S. Cl. ............. 2/267; 2/455; 2/2.5

(58) Field of Classification Search ............ 2/455, 456, 2/458–467, 2.5, 24, 92, 97, 102, 243.1, 248, 2/267, 268, 270, 272
See application file for complete search history.

(56) References Cited

U.S. PATENT DOCUMENTS

| | | | | |
|---|---|---|---|---|
| 3,412,487 A | * | 11/1968 | Diamant | 36/44 |
| 3,417,494 A | * | 12/1968 | Claff | 36/44 |
| 3,530,489 A | * | 9/1970 | Appleton | 36/44 |
| 3,724,106 A | * | 4/1973 | Magidson | 36/44 |
| 3,892,077 A | * | 7/1975 | Wolstenholme et al. | 36/44 |
| 4,291,428 A | * | 9/1981 | Anzani | 12/146 B |
| 4,364,189 A | * | 12/1982 | Bates | 36/31 |
| 4,603,493 A | * | 8/1986 | Eston | 36/44 |
| 4,674,206 A | * | 6/1987 | Lyden | 36/88 |
| 6,338,768 B1 | * | 1/2002 | Chi | 156/269 |
| 2001/0052533 A1 | * | 12/2001 | Kubasik | 224/643 |
| 2002/0152545 A1 | * | 10/2002 | Goodwin | 2/455 |
| 2003/0070209 A1 | * | 4/2003 | Falone et al. | 2/412 |
| 2004/0162511 A1 | * | 8/2004 | Barberio | 602/14 |

* cited by examiner

*Primary Examiner* — Bobby H Muromoto, Jr.
(74) *Attorney, Agent, or Firm* — Mark Young, P.A.

(57) ABSTRACT

Three dimensional fabric matrices are provided for insertion into compartments of or attachment to wearable items and padded items, referred to as contact articles. The matrix includes a core that maintains an air space between inner and outer layers to facilitate heat transfer by convection and evaporation, when the enclosure is breathable. When the enclosure restricts air permeation, the air space provides insulation. Embodiments reconfigurable from insulating to breathable include adjustable impermeable sections that releasably cover permeable sections. The matrix also absorbs shocks and distributes stresses to provide padding and cushioning, including reduction of backface signature in ballistic applications. Wearable items containing one or more matrices offer enhanced thermal regulation and shock absorption.

20 Claims, 14 Drawing Sheets

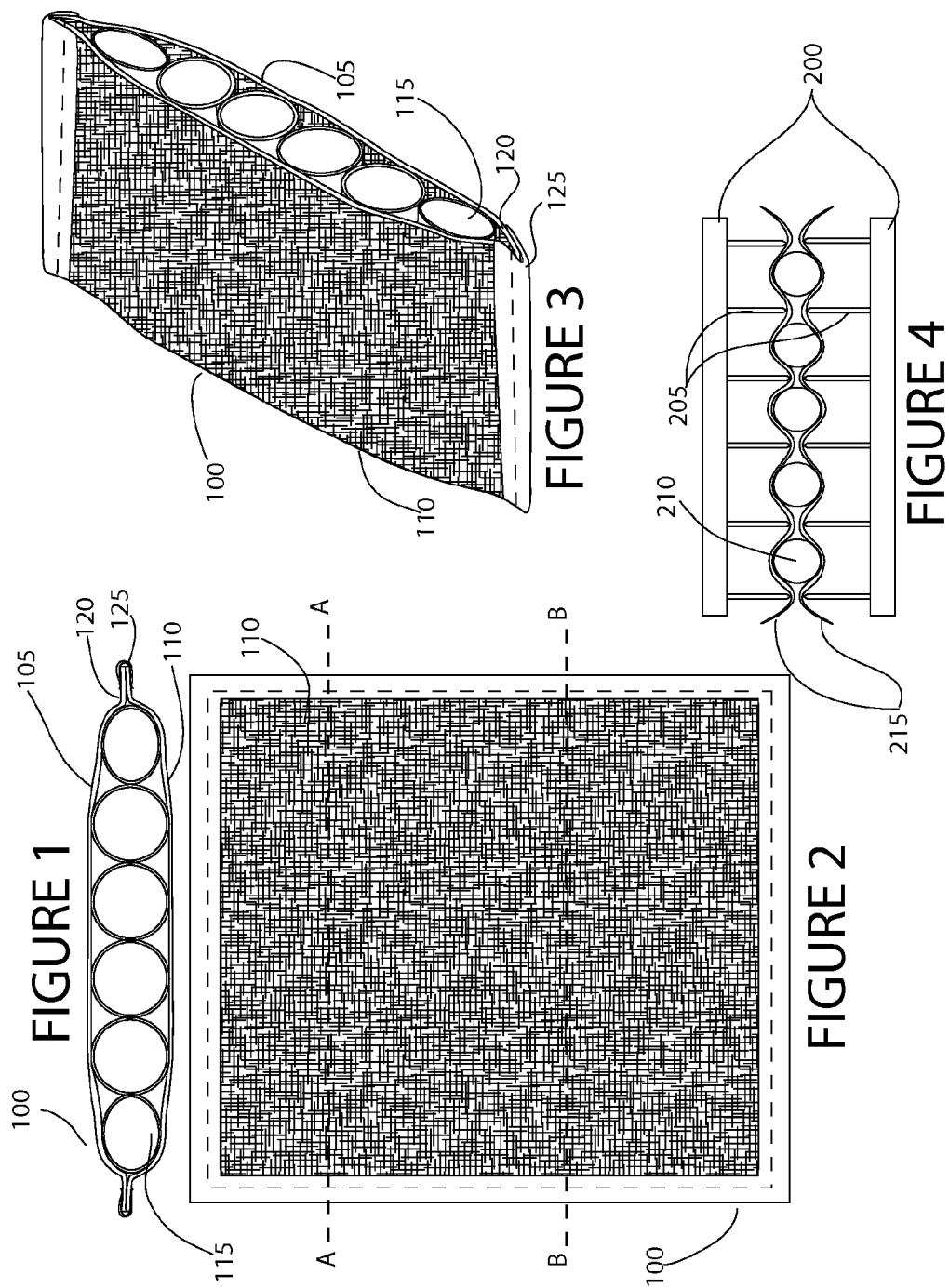

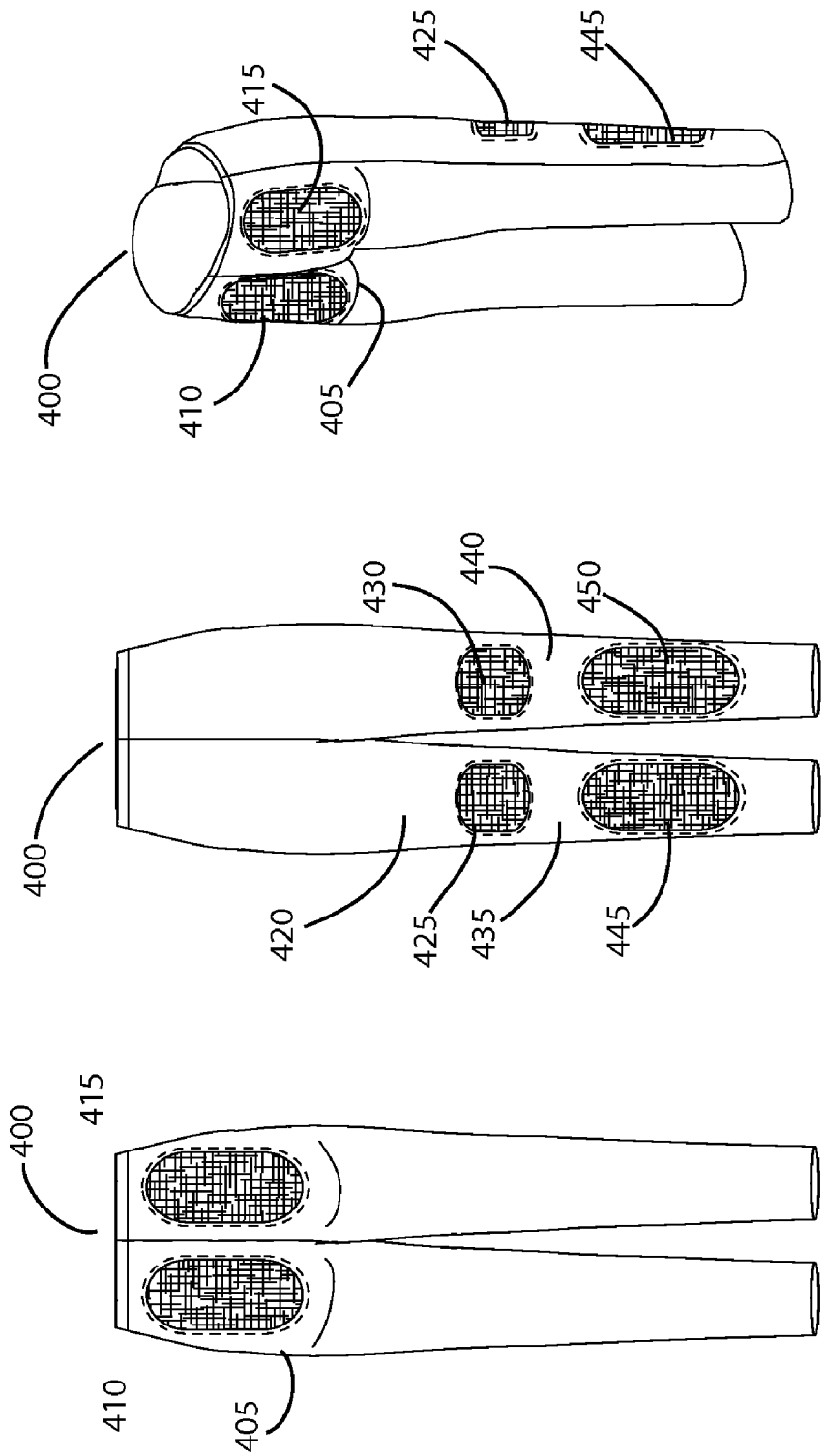

BASELINE

| Shot No. | $T_1$ (μs) | $V_1$ (ft/s) | $T_2$ (μs) | $V_2$ (ft/s) | $V_A$ (ft/s) | $V_s$ (ft/s) | d (mm) |
|---|---|---|---|---|---|---|---|
| 1 | 3438 | 1454 | 3441 | 1453 | 1454 | 1454 | 32 |
| 2 | 3418 | 1463 | 3421 | 1462 | 1462 | 1462 | 31 |
| 3 | 3438 | 1454 | 3440 | 1453 | 1454 | 1454 | 34 |
| 4 | 3448 | 1450 | 3450 | 1449 | 1450 | 1450 | 34 |
| 5 | 3415 | 1464 | 3417 | 1463 | 1464 | 1464 | 32 |
| 6 | 3482 | 1436 | 3484 | 1435 | 1436 | 1436 | 29 |

FIGURE 23

PADDED (1/2" 3D backing)

| Shot No. | $T_1$ (μs) | $V_1$ (ft/s) | $T_2$ (μs) | $V_2$ (ft/s) | $V_A$ (ft/s) | $V_s$ (ft/s) | d (mm) |
|---|---|---|---|---|---|---|---|
| 1 | 3526 | 1418 | 3528 | 1417 | 1418 | 1418 | 22 |
| 2 | 3518 | 1421 | 3520 | 1420 | 1421 | 1421 | 24 |
| 3 | 3505 | 1427 | 3507 | 1426 | 1426 | 1426 | 23 |
| 4 | 3551 | 1408 | 3554 | 1407 | 1407 | 1407 | 18 |
| 5 | 3499 | 1429 | 3501 | 1428 | 1429 | 1429 | 25 |
| 6 | 3498 | 1429 | 3501 | 1428 | 1429 | 1429 | 25 |

FIGURE 24

THERMAL REGULATING AND LOAD BEARING INSERTS FOR WEARABLE AND RELATED ITEMS

RELATED APPLICATION

This application is a nonprovisional and claims the benefit of priority of U.S. Provisional Application 61/148,309 filed Jan. 29, 2009, the entire contents of which are incorporated herein and made a part hereof.

FIELD OF THE INVENTION

This invention relates generally to wearable and related items such as garments and pads for human comfort and, more particularly, to inserts and backings for such items that provide a load bearing three dimensional fabric matrix to maintain a space between fabric layers for air circulation even when a load is applied and/or to provide padding for cushioning or reducing trauma.

BACKGROUND

Current garments offering thermal regulation control for humans are limited in their effectiveness. Many are cumbersome and do not offer mobility. For example, some cooling garments actively circulate a cooling fluid. However, such garments, which may include tubing, a pump and fluid source, tend to be complex and cumbersome as well as susceptible to failure. Also known are fabrics adapted to wick moisture or heat from the skin, thereby providing a cooling effect. These fabric-based systems, however, are only marginally efficient at heat dissipation. Other thermal regulation garments use outdated materials and incorporate complicated and difficult to use technology. Some require the assistance of another person to implement. In addition, current products lose their thermal regulating effectiveness when carrying loads such as body armor, backpacks, protective padding for sports, etc. because the garment's thermal regulation means are occluded, crushed or compacted as a result of the external load.

Concomitantly, many activities exert considerable forces against a garment, and may even necessitate protective padding. For example, participants in contact sports wear elaborate padding systems over or under their uniforms. Similarly, soldiers and other security personnel often wear body armor over or under their uniforms. Many protective pads for athletics are at least partially made of plastic for strength and lightness. Protective cushions are commonly made of foam pads. Such pads are uncomfortable when worn because of the plastic's stiffness and lack of breathability of foam and plastic. Body armor not only tends to be stiff and lack breathability, but fails to adequately minimize trauma resulting from energy transmitted from a projectile impact.

What is needed is a device that provides thermal regulation by maintaining a space between fabric layers, even when a load is applied. The device must maintain the space without unnecessarily compromising reliability, mobility, ease of use or comfort. The device should be adaptable for thermal regulation via insulation and thermal regulation via breathability. The invention is directed to overcoming one or more of the problems and solving one or more of the needs as set forth above.

SUMMARY OF THE INVENTION

To solve one or more of the problems set forth above, in an exemplary implementation of the invention, an insert or pad (i.e., matrix) for a wearable item or cushioned item is provided. The matrix provides thermal regulation and shock absorption, including enhanced load bearing capabilities. The matrix includes a core that maintains an air space between inner and outer fabric layers to provide insulation or facilitate heat transfer by convection and evaporation. The matrix also absorbs shocks and distributes stresses to provide padding and cushioning. An encasement or enclosure provides a unit that may be adapted to a wide range of articles that require enhanced cushioning and/or breathability and/or insulation. The encasement may be configured to provide a permeable envelope or a substantially impermeable envelope. A benefit of this invention is that the space maintained by the matrix facilitates air flow and heat transfer, even when under a compressive load, when the matrix is contained in a permeable envelope or enclosure. When the envelope is impermeable, then the maintained space provides excellent thermal insulation. An additional benefit is that the matrix provides cushioning and padding. The invention achieves these benefits and provides a simple, easy-to-use, lightweight, durable item.

Thus, in accordance with the detailed description provided below and the accompanying claims, a contact article includes a load bearing pad. The load bearing pad includes a three dimensional plastic fabric matrix sandwiched between a pair of coterminous plastic fabric layers, each of the plastic fabric layers having peripheral edges. The three dimensional plastic fabric matrix includes a substantially vacuous, porous, resilient, load-bearing, synthetic yarn core. In one non-limiting embodiment, the core includes a plurality of substantially vacuous, porous, resilient, load-bearing, plastic tubular formations, each tubular formation having a diameter from about 0.2 to 0.75 inches (per layer), and being formed from olefin yarns about 250 mil thick. The peripheral edges of the pair of coterminous plastic fabric layers are joined together to form an envelope with a compartment containing the three dimensional plastic fabric matrix. A strip of thin flexible material is wrapped over and joined to the joined edges of the pair of coterminous plastic fabric layers. The peripheral edges of the pair of coterminous plastic fabric layers may be joined by a thermal bond, a chemical bond, an ultrasonic weld, or stitching. Likewise, the strip of thin flexible material may be joined to the peripheral edges by a thermal bond, a chemical bond, an ultrasonic weld, or stitching. The strip of thin flexible material wrapped over and joined to the joined edges of the pair of coterminous plastic fabric layers may be a PVC, mesh fabric or thermoplastic film other than PVC. The three dimensional plastic fabric matrix experiences about 10% compression at a load of 10 to 25 psi, determined in accordance with ASTM D3575 and provides an air flow of about 1000 CFM, measured in accordance with ASTM D737.

Various contact articles may benefit from the load carrying and/or thermal regulating properties of the pad. Such items include garments, cushions, padding, seat pads or cushions, and vests. For example, a garment with a pocket may contain the pad. The pocket may be positioned at an area of the garment providing thermal regulation. If the fabric layers of the pocket include a portion of air permeable material, the pad may provide breathability. If the fabric layers include materials that restrict air permeation, then the space maintained by the pad provides insulation. The pocket may also be positioned at an area of the garment providing cushioning. For instance, to absorb recoil, a pad may be located at the front shoulder of a garment.

As another example, the load bearing pad may be contained within a fabric envelope attachable to the back of the backpack or to the underside of the straps of a backpack. In each case, the pad may be contained in a fabric envelope including an air permeable material to facilitate breathability (i.e., circulation).

The pad may also be used with a ballistic vest as a cost effective means to reduce backface signature (blunt trauma) and improve wearer comfort. The load bearing pad may be contained within a fabric envelope attachable to the interior surface of a ballistic vest (i.e., the surface that abuts the wearer). Alternatively, the load bearing pad may be contained within an envelope on a shirt to be worn beneath a ballistic vest. The fabric envelope may include an air permeable material to facilitate air circulation. Tests confirm substantial reduction of backface signature of the ballistic vest, by at least 10%, and more specifically about 28% for certain pad configurations as described below.

BRIEF DESCRIPTION OF THE DRAWINGS

The foregoing and other aspects, objects, features and advantages of the invention will become better understood with reference to the following description, appended claims, and accompanying drawings, where:

FIG. 1 is a profile view of an exemplary three-dimensional fabric matrix for use with a contact article such as a garment according to principles of the invention; and FIG. 2 is a plan view of an exemplary three-dimensional fabric matrix for use with a contact article such as a garment according to principles of the invention; and FIG. 3 is a perspective view of an exemplary three-dimensional fabric matrix for use with a contact article such as a garment according to principles of the invention; and FIG. 4 is a schematic that conceptually illustrates one method of forming tubular matrix formations of an exemplary three-dimensional fabric matrix for use with a contact article such as a garment according to principles of the invention; FIG. 7 is a back side view of exemplary pants that include a plurality of compartments, each of which contains a three-dimensional fabric matrix according to principles of the invention; and FIG. 8 is a front side view of exemplary pants that include a plurality of compartments, each of which contains a three-dimensional fabric matrix according to principles of the invention; and FIG. 9 is a perspective view of exemplary pants that include a plurality of compartments, each of which contains a three-dimensional fabric matrix according to principles of the invention; FIG. 23 is a table of baseline ballistic testing results for a vest (e.g., an armored vest) and a clay ballistic testing apparatus; and FIG. 24 is a table of ballistic testing results for a vest (e.g., an armored vest) with a trauma reducing backing pad and a clay ballistic testing apparatus according to FIG. 20.

Figure 5:
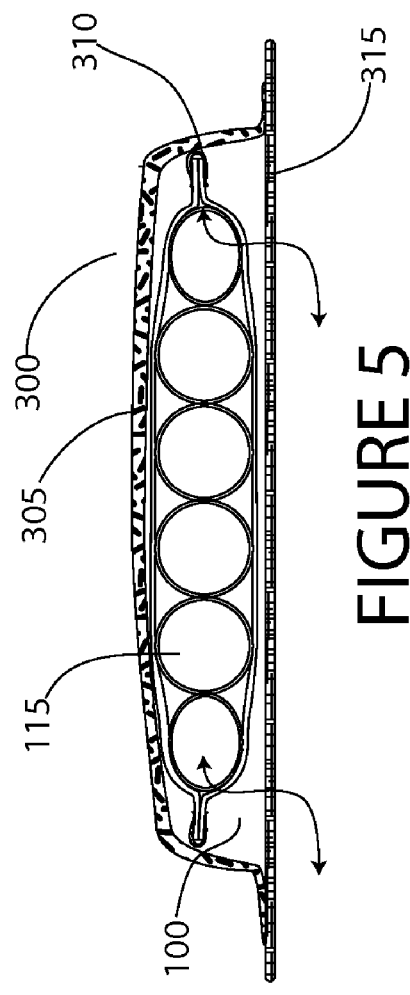
FIG. 5 is a profile view of a section of an exemplary compartment of a garment containing a three-dimensional fabric matrix in an undeformed state according to principles of the invention.

Those skilled in the art will appreciate that the figures are not intended to be drawn to any particular scale; nor are the figures intended to illustrate every embodiment of the invention. The invention is not limited to the exemplary embodiments depicted in the figures or the types of garments, configuration, shapes, relative sizes, ornamental aspects or proportions shown in the figures.

DETAILED DESCRIPTION

For convenience of reference, wearable items and items used against a person, such as pads and body armor, are referred to herein as contact articles. Contact articles experience forces and heat transfer due to human contact and ambient conditions. Contact articles abut a person, although in some embodiments one or more layers of clothing may be between the contact article and the person. Regardless of whether none, one or more layers of clothing separate the item from the person, the item is considered a contact article if forces are communicated between the item and the person and heat is transferred between the item and the person. Nonlimiting examples of contact articles include garments, padding, bedding and seat cushions.

Referring to the Figures, in which like parts are indicated with the same reference numerals, various views of an exemplary three-dimensional (3D) fabric matrix (also referred to as a matrix or insert) and wearable items containing such a matrix are conceptually shown. With reference to FIGS. 1 through 3, various views of an exemplary 3D fabric plastic matrix 100 for use with a garment according to principles of the invention is conceptually illustrated. The matrix includes a substantially vacuous, porous, resilient, load-bearing, core sandwiched between two fabric layers 105, 110. In the exemplary embodiment the core comprises a plurality of porous, permeable tubular structures 115. The tubular structures 115 support the fabric layers 105, 110 in a spaced apart and substantially parallel relationship. Thus, fluids, such as air, may fill and travel through the empty space defined by the core between the fabric layers 105, 110. Additionally, the tubular structures 115 provide an elastic framework that carries loads and distributes stresses. The matrix, including the core, is comprised of fabrics of synthetic yarns, such as olefin yarns, that are lightweight, durable and preferably hydrophobic. The peripheral free edges 120 of the fabric layers 105, 110 are attached (i.e., joined or bonded) together, such as by heat or ultrasonic welding, a mechanical union (e.g., stitching) or by chemical bonding. Then a covering 125, such as a PVC trim, is attached over the attached edges 120, such as by stitching, heat or ultrasonic welding or chemical bonding. Materials other than PVC, such as mesh fabric or thermoplastic film other than PVC may be used to finish the edges 120. Thus, the free edges are clean and not frayed. This joining and covering not only provides clean edges, but also improves load-bearing capabilities by enhancing lateral stability, thereby reducing the tendency of core elements to deform laterally.

As used herein the term olefin refers to olefin polymers, particularly polyolefin polymers, such as, but not limited to polyethylene and polypropylene. Low density (i.e., $\rho<1$ g/cm$^3$) polyolefin polymers are preferred.

As used herein tubular refers to an elongated hollow structure, without regard to its cross-sectional shape. The cross-section shape may be circular or non-circular.

The core may be formed using any suitable process. The structures that define the core, such as corrugation, tubular structures or the like, may be formed individually and bonded (e.g., thermally, chemically or physically) between the fabric layers 105, 110. Alternatively, a pair of non-drawn fabric sheets may be sandwiched and constrained between drawn fabric sheets. Then the sheets may be heated, causing the non-drawn sandwiched sheets to deform or warp. The deformed sheets sandwiched and constrained between the drawn sheets form the core. In yet another alternative, opposing fabric sheets 215 may be pinched together and thermally bonded between parallel cylindrical mandrels 210 using opposing teeth 205 of a heated press 200. Any method now known or hereafter developed for forming a fabric matrix with a core as described above, may be utilized and is intended to come within the scope of the invention. The invention is not limited to a tubular or corrugated core structure or to any particular method of manufacture.

In a particular exemplary implementation, the matrix comprises Nicolon® 3-D by Royal TenCate of the Netherlands, or its affiliate TenCate Geosynthetics North America, Inc. of Atlanta, Ga. Such an exemplary matrix comprises olefin yarns woven into a three-dimensional fabric.

The matrices are stackable and attachable. Thus, for example, a plurality of matrices may be stacked and, optionally, attached together, to increase load bearing and/or thermal regulation capacity. In a stacked arrangement, each tubular formation in each layer may have a diameter of at least about 0.2 to 0.75 inches. Thus, for example, a stack may comprise two layers with each layer having a thickness or diameter of 0.25 inches for a total thickness of about 0.50 inches. The thickness or diameters may be the same or different in stacked layers. Thus, for example, one layer may be 0.25 inches, while another layer may be 0.50 inches. Layers may be stacked with the matrices offset, such that the centerlines of tubular structures in one layer being aligned with edges (not the centerlines) of tubular structures in an abutting layer. Alternatively, the centerlines of tubular structures in abutting layers may be aligned.

Alternative matrices may be utilized. For example, where a more flexible (less rigid) matrix is desired, a fabric such as Dow Corning's S7-005, S7-005 or S5-004 may be utilized without departing from the scope of the invention. Again, the peripheral free edges 120 of the fabric layers 105, 110 are attached (i.e., joined or bonded) together, such as by heat or ultrasonic welding, a mechanical union (e.g., stitching) or by chemical bonding. Then a covering 125, such as a PVC trim, is attached over the attached edges 120, such as by stitching, heat or ultrasonic welding or chemical bonding. Materials other than PVC, such as mesh fabric or thermoplastic film other than PVC may be used to finish the edges 120. Thus, the free edges are clean and not frayed. This joining and covering not only provides clean edges, but also improves load-bearing capabilities by enhancing lateral stability, thereby reducing the tendency of core elements to deform laterally.

Figure 27:
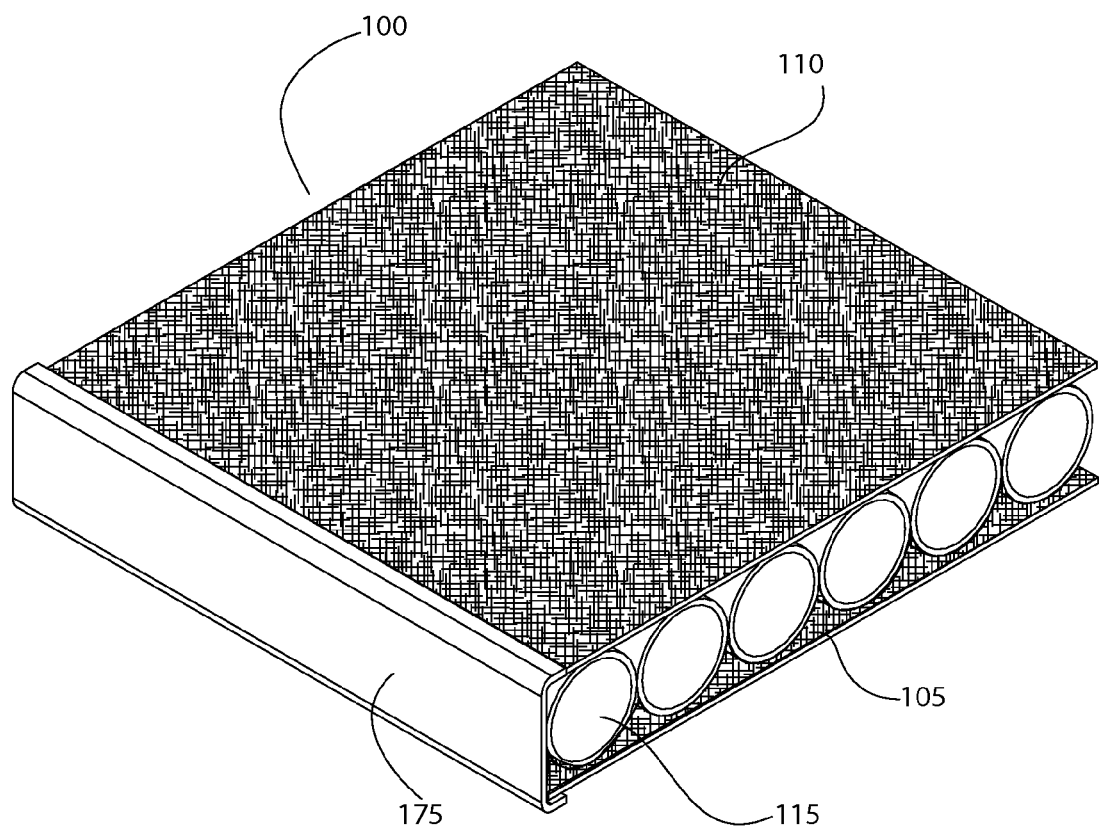
FIG. 27 is a perspective view of an exemplary three-dimensional fabric matrix with unjoined peripheral edges for use with a contact article such as a garment according to principles of the invention.

In another embodiment, as shown in FIG. 27, the peripheral free edges of the fabric layers 105, 110 are not attached (i.e., joined or bonded) together. However, they are covered with a fabric or film 175 that prevents frayed edges from protruding through the covering. This covering 175 not only provides clean edges, but also improves breathability or insulation characteristics by maintaining a space of substantially consistent width to the peripheral edge.

Some applications may require or benefit from greater stiffness (i.e., modulus of elasticity) and/or a lower density material and/or construction. By way of example, a pad for use in conjunction with an armored vest may benefit from low density and high modulus. Thus, a thermoplastic material in woven form such as an olefin fiber weave is preferred. Olefin materials typically have a higher modulus and lower density than silicone. A weave also tends to use less material overall than an extruded or molded sheet or structure. A weave may also be preferred due to the unique ability of woven strands to bunch together and, in concert, resist loads (as discussed in more detail below).

Figure 6:
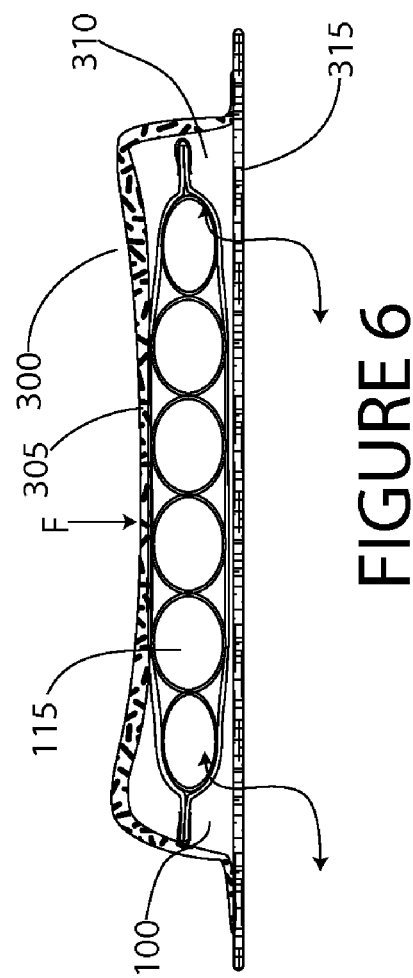
FIG. 6 is a profile view of a section of an exemplary compartment of a garment containing a three-dimensional fabric matrix in a deformed state according to principles of the invention.

Referring now to FIGS. 5 and 6, profile views of a section of an exemplary compartment 300 of a garment containing a three-dimensional fabric matrix in undeformed and compressed states according to principles of the invention are shown, respectively. The plastic matrix 100 is disposed in a space 310 defined between layers of fabric 305, 315. The matrix maintains a space between the fabric layers 305, 315, even when a load is applied. The core 115 provides space for air, convection and evaporation. The core 115 also provides a structural framework. The plastic matrix 100 may be removable, such as by providing a releasable flap or zipper to access the interior of the compartment. In such case, the plastic matrix 100 may be removed and/or replaced as necessary or desired. Alternatively, the compartment 300 may be stitched and/or bonded closed.

The invention is not limited to enclosing the matrix in a compartment (i.e., envelope or encasement) made from any particular fabrics. In one exemplary embodiment, the outer layer of fabric 305, i.e., the fabric layer furthest from the wearer, and the inner layer of fabric 315, i.e., the fabric layer closest to the wearer, is preferably a fabric configured to direct (e.g., wick) water away from the body. Thus perspiration moves away from the body more effectively. Nonlimiting examples include Nikwax Analogy and FurTech fabrics, which are breathable in the conventional sense; although these examples are actually a combination of two different fabrics, a directional "pump" layer underneath a distinct windproof and water resistant outer layer. While they are effectively completely waterproof against rain, they would eventually allow standing water to pass through. Other wicking fabrics that are now known or hereafter developed may be used for the outer and inner layers 305, 315.

In an alternative embodiment, the outer layer of fabric 305 may be breathable and waterproof, allowing air and vapor, but not water, to pass through. Such waterproof and breathable fabrics are well known in the art. Nonlimiting examples include: eVent by eVent fabrics, Nikwax Directional Textiles as used by Páramo Directional Clothing Systems, Gore-Tex, Sympatex, 3-ply Entrant-EVmembrane, AquaNix by Taiga Works, Entrant by Toray Industries, Dermizax by Toray Industries, Drilite Extreme by Mountain Equipment, HyVent by Toray, H2No by Toray, Omni-Tech by Columbia Sportswear, Conduit by Mountain Hardwear, Triplepoint Ceramic by Lowe Alpine, Precip by Marmot, Watergate by Outdoor Designs, Closely woven polymer-encapsulated cotton EPIC by Nextec, Wax impregnated cotton or cotton/polyester mixes, Hyper-Dri by Mark's Work Wearhouse, Ventile by Ventile, Trilogy by Ripzone, and others now known or hereafter developed.

The plastic matrix 100 absorbs shocks and static loads while maintaining a space between fabric layers to facilitate heat transfer. The outer layer of fabric 305 transmits exerted compressive forces F to the plastic matrix 100, causing the elastic core 115 to deform. By way of illustration and not limitation, the compressive force may be due to any number of sources, e.g., a load such as a backpack or other gear being carried, padding such as shoulder pads or chest protectors being worn by athletes, armor worn by soldiers and law enforcement personnel, or sitting or kneeling. In each case, the stress that results from the load is distributed throughout the core 115, as shown in FIG. 6. While the load is applied a space is maintained between the fabric layers for thermal management. Throughout normal loading, the plastic matrix 100 maintains space between the fabric layers 305, 315 to facilitate heat transfer through convection and evaporation. The plastic matrix exhibits resiliency. Thus, under normal loading conditions, when the force F is relieved, the plastic matrix 100 and core 115 return to an undeformed shape, as shown in FIG. 5. Of course, in the undeformed state, the plastic matrix 100 maintains an even wider space between the fabric layers 305, 315 to provided insulation or facilitate heat transfer through convection and evaporation.

An insert according to principles of the invention provides excellent breathability (i.e., air permeability), insulation and load absorption capabilities in a convenient, lightweight insertable assembly. By way of example and not limitation, a plastic matrix comprising about 250 mil (±25%) thick (e.g., diameter) olefin yarns, with 0.25 inch diameter tubular formations, will weigh about 18 to 20 ounces per square yard and withstand about 10 to 25 psi at 10% compression (ASTM D3575), 15 to 30 psi at 25% compression and 25 to 35 psi at 50% compression. Such a matrix provides an air flow of about 1000 CFM, measured in accordance with ASTM D737, Standard Test Method for Air Permeability of Textile Fabrics.

The core 115 also provides a structural framework. The plastic matrix 100 may be removable, such as by providing a releasable flap or zipper to access the interior of the compartment. In such case, the plastic matrix 100 may be removed and/or replaced as necessary or desired. Alternatively, the compartment 300 may be stitched and/or bonded closed.

Figure 25:
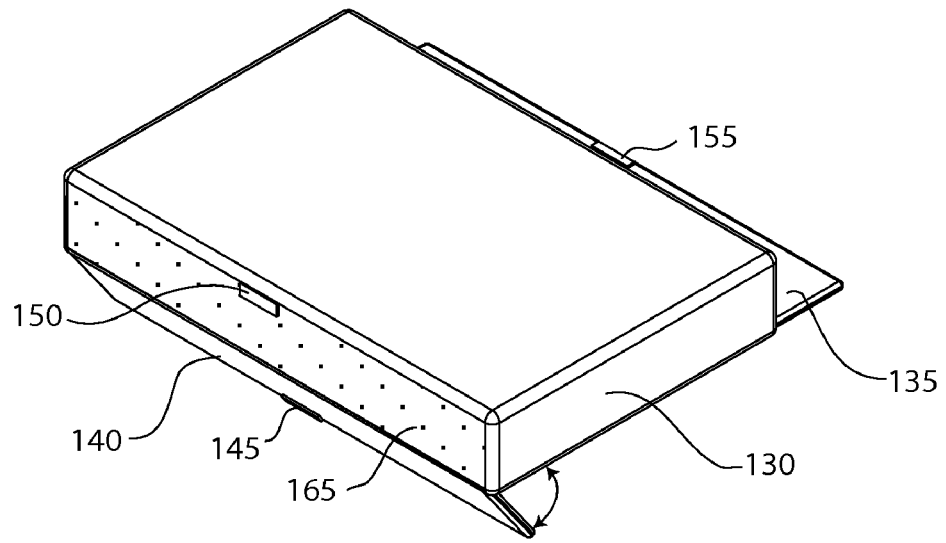
FIG. 25 is a perspective view of an exemplary pad that has permeable and/or impermeable side panels and contains a three-dimensional fabric matrix according to principles of the invention.
Figure 26:
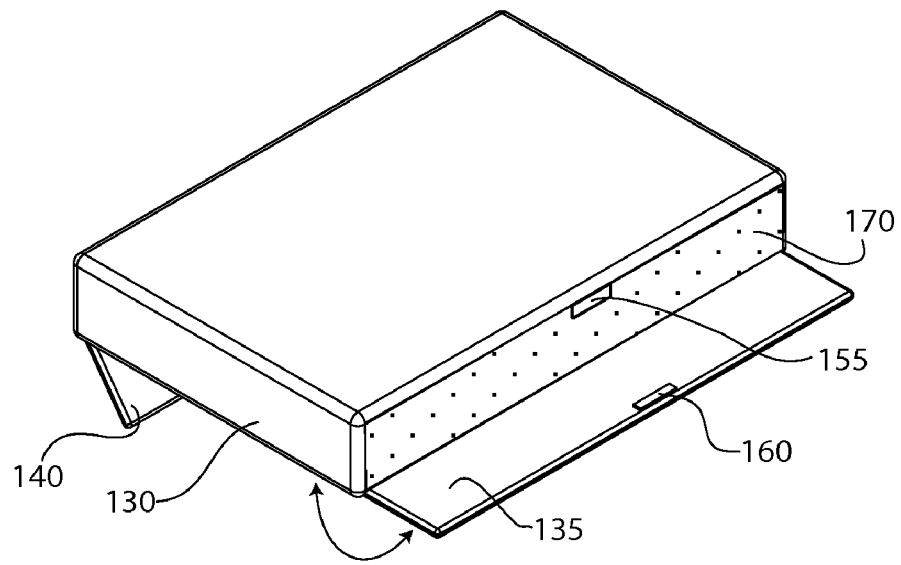
FIG. 26 is another perspective view of an exemplary pad that has permeable and/or impermeable side panels and contains a three-dimensional fabric matrix according to principles of the invention.

Advantageously, an insert or padding accessory enables insulation and ventilation, depending upon the material within which it is contained or to which it is attached. The insert or accessory may comprise a container or envelope 130 housing the 3D fabric plastic matrix 100. As described above with reference to FIGS. 1 through 3, the 3D fabric plastic matrix 100 includes a substantially vacuous, porous, resilient, load-bearing, core sandwiched between two fabric layers 105, 110. In an exemplary embodiment the core comprises a plurality of porous, permeable tubular structures 115. The tubular structures 115 support the fabric layers 105, 110 in a spaced apart and substantially parallel relationship. With reference to FIGS. 25 and 26, when the 3D fabric plastic matrix 100 is contained in a breathable enclosure 130, such as one that includes breathable (i.e., air permeable) sections 165, 170 (e.g., permeable edges), air may circulate through the space maintained by the 3D fabric plastic matrix 100. When used with a garment, the circulating air carries hot air, laden with evaporated sweat, away from a wearer's body and allows the space to be replenished with fresh air. When the insert is contained in an impermeable enclosure or an enclosure with low air permeability, an insulating air pocket is maintained in the space defined by the core 115, thereby protecting the wearer from ambient conditions.

In one embodiment, the enclosure may include removable or foldable panels 135, 140 that exhibit impermeability or low air permeability. Such panels may be removed or folded to expose underlying permeable panels 165, 170. In the open position, the panels 135, 140 that exhibit impermeability or low air permeability are folded or removed to expose the underlying permeable panels 165, 170. In the closed position, the panels 135, 140 that exhibit impermeability or low air permeability are positioned to cover the underlying permeable panels 165, 170. Snaps, buttons, hook and loop fasteners 145, 150, 155, 160, magnets or other fasteners may be provided to retain the removed or folded panels in the open and closed positions. Thus, the enclosure may be converted between ventilating and insulating modes. The shape and size of the enclosure is not particularly important, so long as it is suitable for housing the 3D fabric plastic matrix 100.

Referring now to FIGS. 7 through 9, a pair of pants 400 is shown with a plurality of compartments, each containing a three-dimensional fabric matrix, as described above. By way of example and not limitation, such compartments may include a pair of compartments 410, 415 over the buttocks area 405 to facilitate heat transfer and provide shock absorption and stress distribution. On the front side 420, compartments 425, 430 may be provided over the knee of each pant leg 435, 440 as a kneepad, for shock absorption and stress distribution. Likewise, on the front side 420, compartments 445, 450 may be provided over the shin of each pant leg 435, 440, as a shin guard, for shock absorption and stress distribution.

The invention is not limited to the exemplary compartments shown in FIGS. 7 through 9. Some of the compartments may be omitted, without departing from the spirit and scope of the invention. Other compartments may be provided on the pants in addition to or in lieu of some or all of the exemplary compartments shown in FIGS. 7 through 9, without departing from the spirit and scope of the invention.

Figure 10:
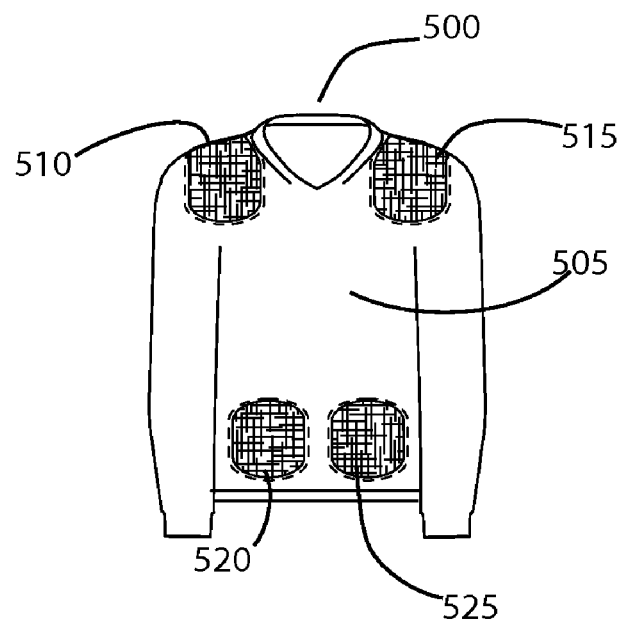
FIG. 10 is a front side view of an exemplary shirt that includes a plurality of compartments, each of which contains a three-dimensional fabric matrix according to principles of the invention.
Figure 11:
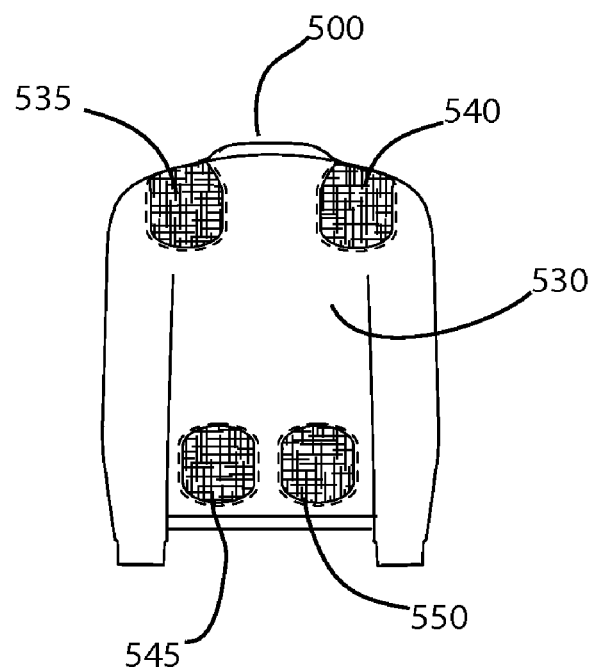
FIG. 11 is a back side view of an exemplary shirt that includes a plurality of compartments, each of which contains a three-dimensional fabric matrix according to principles of the invention.

Referring now to FIGS. 10 and 11, a shirt 500 is shown with a plurality of compartments, each containing a three-dimensional fabric matrix, as described above. By way of example and not limitation, such compartments may include a pair of front and rear shoulder compartments 510, 515, 535, 540 to facilitate heat transfer and provide shock absorption and stress distribution. On the front side 505, compartments 520, 525 may also be provided over portions of the midriff (and/or the chest), to facilitate heat transfer and provide shock absorption and stress distribution. Likewise, on the back side 530, compartments 545, 550 may be provided over the lower, upper and or mid back, to facilitate heat transfer and provide shock absorption and stress distribution.

The invention is not limited to the exemplary compartments shown in FIGS. 10 and 11. Some of the compartments may be omitted, without departing from the spirit and scope of the invention. Other compartments may be provided on the shirt in addition to or in lieu of some or all of the exemplary compartments shown in FIGS. 10 and 11, without departing from the spirit and scope of the invention.

Figure 12:
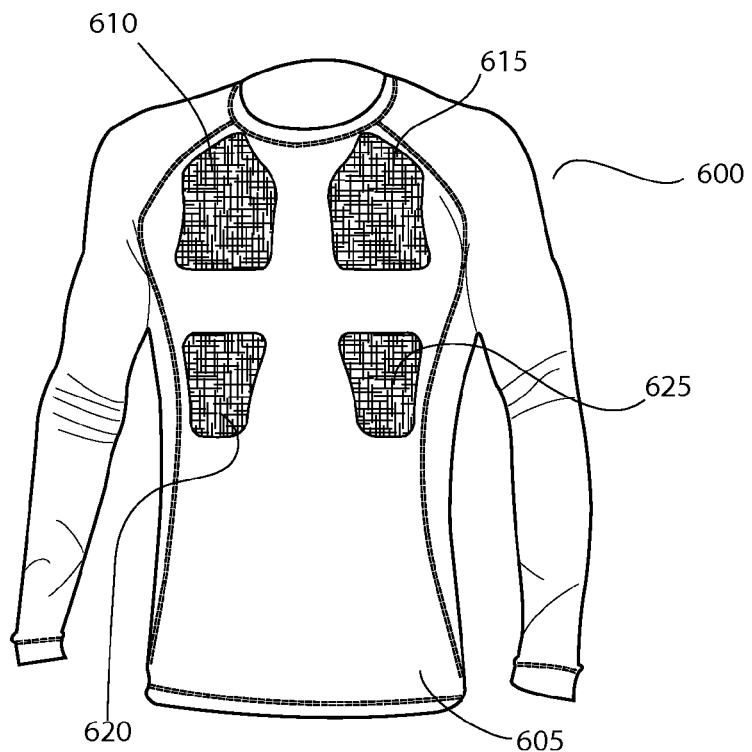
FIG. 12 is a front side view of another exemplary shirt that includes a plurality of compartments, each of which contains a three-dimensional fabric matrix according to principles of the invention.
Figure 13:
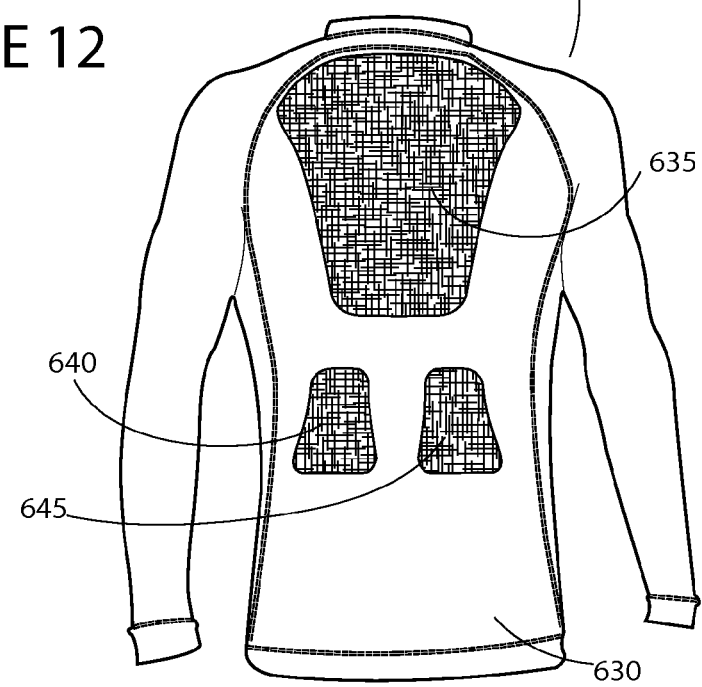
FIG. 13 is a back side view of the other exemplary shirt that includes a plurality of compartments, each of which contains a three-dimensional fabric matrix according to principles of the invention.

Referring now to FIGS. 12 and 13, another shirt 600 is shown with a plurality of compartments, each containing a three-dimensional fabric matrix, as described above. By way of example and not limitation, such compartments may include a pair of breast and abdomen compartments 610, 615, 620, 625 on the front side 605 of the shirt and an upper back compartment 635, as well as lumbar compartments 640, 645, on the back side 630 of the shirt. The compartments facilitate heat transfer by maintaining a space between fabric layers and provide shock absorption and stress distribution. By way of example and not limitation, the upper back compartment 635 may be disposed between a backpack and wearer while the breast compartments 640, 645 are disposed between the straps of a backpack and a wearer. Alternatively, the upper back compartment 635 may be disposed between the back of a seat (e.g., a seat in a motor vehicle) and the wearer, while a breast compartment (e.g., compartment 615) and an abdomen compartment 620 may be disposed between the strap of a seatbelt and a wearer.

The invention is not limited to the exemplary compartments shown in FIGS. 12 and 13. Some of the compartments may be omitted, without departing from the spirit and scope of the invention. Other compartments may be provided on the shirt in addition to or in lieu of some or all of the exemplary compartments shown in FIGS. 12 and 13, without departing from the spirit and scope of the invention.

Figure 14:
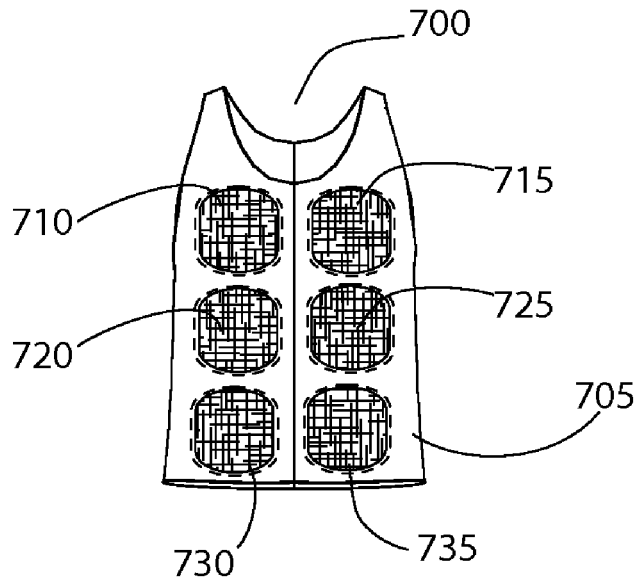
FIG. 14 is a front side view of an exemplary vest (e.g., an armored vest) that includes a plurality of compartments, each of which contains a three-dimensional fabric matrix according to principles of the invention and is positioned between the wearer's body and the armor.
Figure 15:
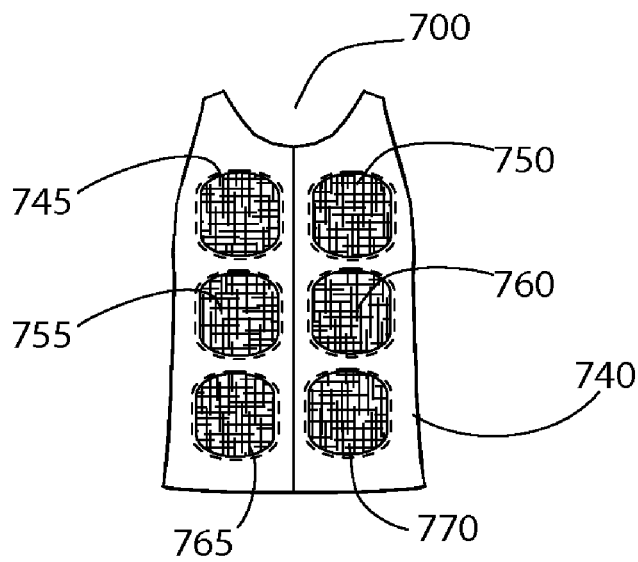
FIG. 15 is a front side view of an exemplary vest (e.g., an armored vest) that includes a plurality of compartments, each of which contains a three-dimensional fabric matrix according to principles of the invention and is positioned between the wearer's body and the armor.

Referring now to FIGS. 14 and 15, an armored vest 700 is shown with a plurality of compartments, each containing a three-dimensional fabric matrix, as described above. By way of example and not limitation, such compartments may include several compartments 710, 715, 720, 725, 730, 735, on the front side 715, to maintain a space between the armor and the wearer, thereby facilitating heat transfer. As an additional benefit, the compartments provide shock absorption and stress distribution. Likewise, several compartments 745, 750, 755, 760, 765, 770 may be provided on the back side 740. Again, the compartments maintain a space between the armor and the wearer, thereby facilitating heat transfer, and also provide shock absorption and stress distribution.

Figure 16:
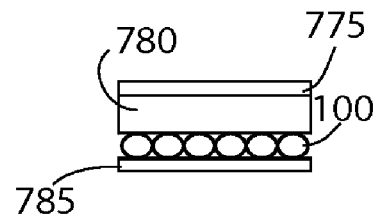
FIG. 16 is a schematic that conceptually illustrates a layer of armor and a 3-D fabric backing sandwiched between layers of fabric of an armored vest according to principles of the invention.

As shown in the cross section of FIG. 16, the plastic matrix 100 of each compartment resides between an inner layer of fabric 785 (i.e., the layer adjacent to a wearer's body) and the armor 780. An outer layer of fabric 775 may cover the armor 780. Thus, the plastic matrix 100 will maintain a space between the armor and the wearer. The plastic matrix 100 will also help absorb and distribute the stress of a projectile strike against the armor, thereby reducing the risk and severity of contusion.

The invention is not limited to the exemplary compartments shown in FIGS. 14 through 16. Some of the compartments may be omitted, without departing from the spirit and scope of the invention. Other compartments may be provided on the vest in addition to or in lieu of some or all of the exemplary compartments shown in FIGS. 14 and 15, without departing from the spirit and scope of the invention.

Figure 28:
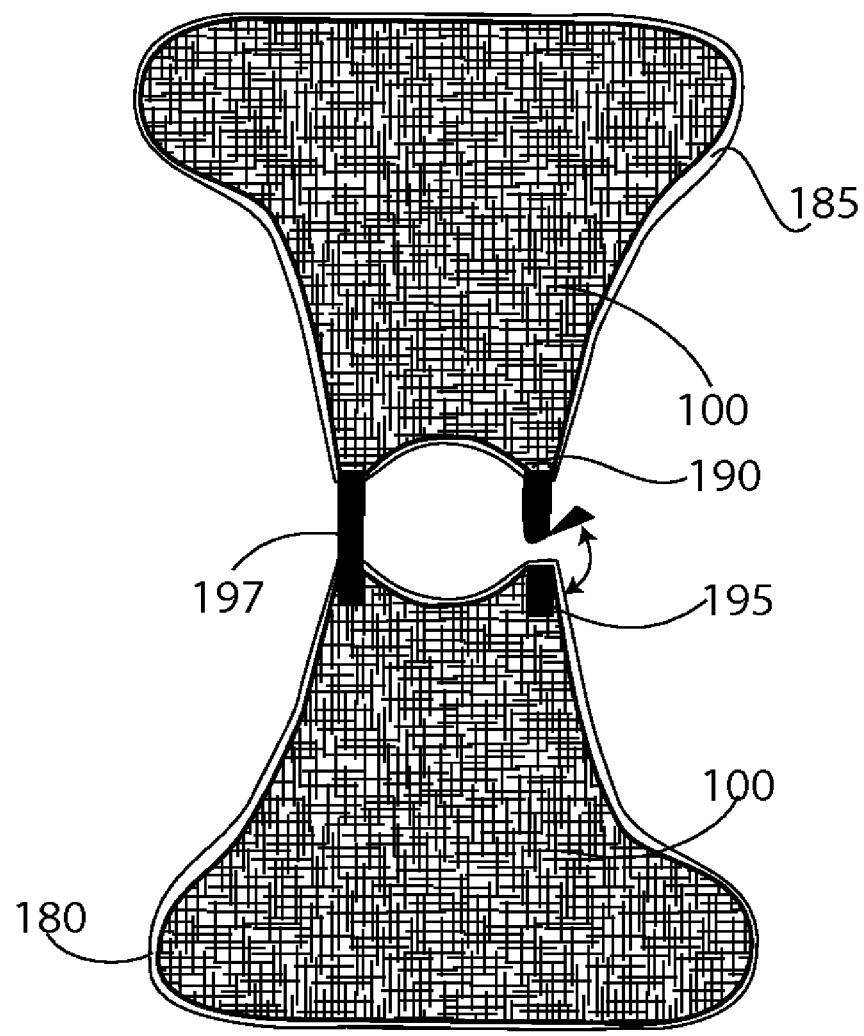
FIG. 28 is a plan view of an exemplary underlay vest that includes front and back sections, each of which contains a three-dimensional fabric matrix according to principles of the invention, and is to be worn between the wearer's body and an armored vest.
Figure 29:
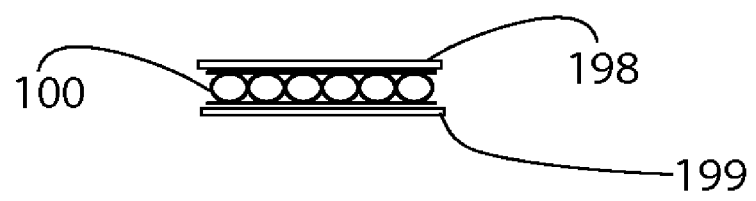
FIG. 29 is a cross section view of a portion of an exemplary underlay vest that includes front and back sections, each of which contains a three-dimensional fabric matrix according to principles of the invention, and is to be worn between the wearer's body and an armored vest.

In another embodiment, an underlay vest is provided, as shown in FIG. 28. The underlay vest is comprised of a front and back panel 180, 185, each of which includes one or more plastic matrix inserts 100 between breathable fabric layers. The plastic matrix inserts may be permanently contained in the underlay vest, or removably contained in pockets, or attached to a surface of the underlay. As shown in FIG. 29, the matrix 100 is sandwiched between fabric layers 198, 199 of the front and back panels 180, 185. Hook and loop shoulder straps 190, 195 and 197 provide adjustable attachments. The underlay vest may be worn beneath the armored vest 700 to enhance thermal regulation and reduce backface signature (i.e., blunt trauma).

In yet another embodiment, the plastic matrix 100 may be contained in the armored vest 700. For example, plastic matrix 100 may be enclosed in pockets formed in armored vest 700. The pockets may comprise breathable fabric to facilitate thermal regulation.

While various plastic matrix 100 materials and structures are described herein, those having a relatively high modulus are preferred for ballistic applications. Thus, for example, in such applications, matrices comprising olefin or polyolefin yarns are preferred over those comprising silicone.

While various plastic matrix 100 constructions are described herein, those having a woven structure are preferred for ballistic applications and any other applications that require absorption of substantial loads. A woven structure allows bunching movement of the interlaced yarns relative to one another. Illustratively, as a force is applied, portions of adjacent wefts may be urged closely together. The wefts may move in sliding fashion along the warps. This bunching movement allows the bunched yarns to work in concert to resist a load. Such "bunchable" structures are preferred for ballistic applications. In contrast, molded or cast structures that do not accommodate relative movement of strands may not offer the ability of strands to bunch together and work in concert to resist a load.

Figure 17:
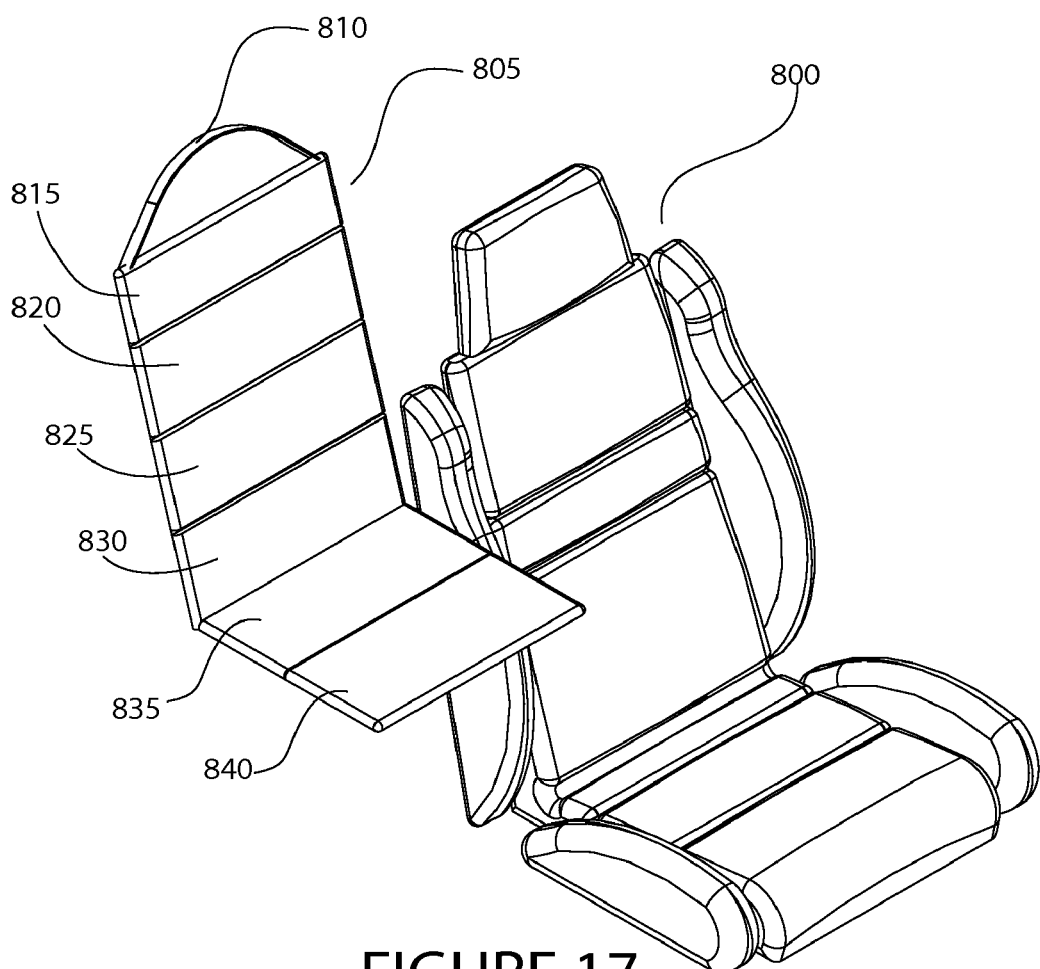
FIG. 17 is a perspective view of an exemplary seat pad that includes a plurality of compartments, each of which contains a three-dimensional fabric matrix according to principles of the invention and is configured for placement on the surface of a seat.

Referring now to FIG. 17, an embodiment of a padded assembly 805 in accordance with principles of the invention is shown. The particular padded assembly 805 shown is a pad for a seat 800 with a plurality of connected compartments 815-840, each containing a three-dimensional fabric matrix, as described above. By way of example and not limitation, such compartments may include several compartments 815-830 over the backrest area and a pair of compartments 835, 840 over the buttocks area to facilitate heat transfer and provide shock absorption and stress distribution.

Figure 18:
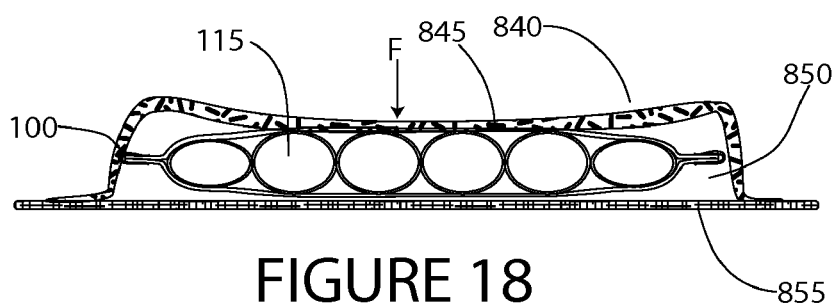
FIG. 18 is a profile view of a section of an exemplary compartment of a seat pad containing a three-dimensional fabric matrix in a deformed state according to principles of the invention.

Referring now to FIG. 18, a profile view of a section of an exemplary compartment (e.g., compartment 840) containing a three-dimensional fabric matrix in a compressed state according to principles of the invention is shown, respectively. The plastic matrix 100 is disposed in a space 850 defined between layers of fabric 845, 855. The matrix 100 maintains a space between the fabric layers 845, 855, even when a load is applied. The core 115 (e.g., the tubular core) maintains space for air, convection and evaporation. The core 115 also provides a structural framework. The plastic matrix 100 may be removable, such as by providing a releasable flap or zipper to access the interior of the compartment. In such case, the plastic matrix 100 may be removed and/or replaced as necessary or desired. Alternatively, the compartment 840 may be stitched and/or bonded closed.

The invention is not limited to enclosing the matrix in a compartment made from any particular fabrics. In one exemplary embodiment, the top layer of fabric 845 is a fabric configured to direct (e.g., wick) water away from the body. Thus perspiration moves away from the body more effectively. Nonlimiting examples include Nikwax Analogy and FurTech fabrics, which are breathable in the conventional sense; although these examples are actually a combination of two different fabrics, a directional "pump" layer underneath a distinct windproof and water resistant outer layer. Other wicking fabrics that are now known or hereafter developed may be used for the outer and inner layers 305, 315.

In an exemplary embodiment, the both layers of fabric 845, 855 may be breathable, allowing air and vapor, to pass through. Breathable fabrics are well known in the art. Such fabrics allow air to pass through the pad assembly 805 to and from the seat 800. Such breathability is particularly advantageous for seats equipped with heating and/or cooling means, as found in many luxury vehicles.

In sum, this invention combines the use of a 3D fabric matrix to create a more efficient and easy to use thermal regulation system. It also provides cushioning and padding as needed. Whereas all fabrics are three dimensional in a technical sense, the inventive garments with a 3D fabric matrix maintain an area between the outer and inner layers. This creates a cross section with a hollow expanse of air space and provides a structural matrix which is very resistant to compression. Thus the matrix maintains the space even when loaded. The air space allows for greater thermal regulating properties. Air can flow more easily for cooling or can be trapped more easily for warming. It also allows water vapor created by the body to evaporate more easily. Synthetic fibers such as nylon and polyester, or a natural fiber such as wool, are characteristically insulating materials and allow water vapor to evaporate. When combined with a 3D fabric matrix, one gets a super insulating micro environment for the wearer. When 3D fabric matrices are combined with moisture absorbing fabrics, such as cotton, the benefits of the 3D fabric matrix are not affected. In fact, they facilitate moisture evaporation.

To make a garment using the aforementioned materials, one must first cut the 3D fabric matrix in a specific way in order that it does not fray at the edges. Frayed edges can penetrate the shell material and rub against the skin causing irritation for the wearer. Normally, fabrics require an over-edge stitch to prevent fraying. In some cases, 3D fabric matrices may not accept a needle, so an alternate method must be used. This may include melting or bonding the cut edge and/or wrapping or covering the cut edge with a secondary material in order to finish the edge. Cutting and bonding of the edges may be accomplished using a cutting means, heat and pressure, with or without a bonding agent. For example, a hot cutting edge may cut the matrix to size and a pair of heated platens may be pressed together to thermally join the cut edges. A strip of thin flexible material (e.g., PVC) may then be wrapped over the edge and joined thereto by stitching. The finished pieces of 3D fabric matrix constitute inserts that may then put in pockets strategically located in a garment or other wearable item (e.g., armored vest, athletic padding, etc.) and then secured in place. The placement of the inserts is important in order to maximize the most effective benefits of the thermal regulating, padding, and cushioning properties of the 3D material while allowing the greatest range of movement for the use intended. The insert helps regulate the body's temperature while providing padding and cushioning.

Such inserts have many uses. For example, the inserts may be included in shirts for backpacking and other activities requiring the carrying of loads. Inserts can be included in undergarments to other pieces of outer clothing such as jackets, sweaters, and shirts. Inserts can also be provided under armor of protective armored garments used by the police, security and military. Additionally, inserts can be provided under protective garments used in a variety sports. Moreover, outerwear such as jackets and coats may include such inserts for enhanced thermal regulation. Protective garments may have inserts incorporated directly into the inside of the garment which rests against the wearer's body. The same is true for padding used in sports. The benefits of using inserts in garments are enhanced thermal regulation along with enhanced cushioning and padding. Inserts accomplish this by creating and maintaining a space between the wearer and the outer environment. This space permits more air to flow when needed thus allowing the wearer to stay cooler and permits more air to be trapped when needed to provide greater warmth. The inserts also provide cushioning characteristics useful to minimize the adverse affects of load bearing and sudden impacts.

A widely used type of body armor is a flexible protective undergarment, which is worn under normal clothes. Such garments are relatively comfortable, lightweight and not unduly restrictive of movement. Typical body armor garments are designed to provide full front, side, and rear protection. Modern versions of such garments typically use a hook-and-loop tape fastening system for fastening.

Typically, flexible body armor is constructed of multiple layers of ballistic-resistant materials, assembled into a "protective panel." The multiple layers of ballistic-resistant materials are comprised of tightly woven fibers (e.g., aramid fibers) that may be coated with a resin substance and sandwiched between layers of plastic film. The woven layers of fibers work together in preventing the bullet from penetrating and dissipating the forces that can cause nonpenetrating injuries (i.e., blunt trauma). The protective panel is inserted into a carrier constructed of conventional garment fabrics such as nylon or cotton. The protective panel may be permanently sewn into the carrier or may be removable.

In addition to stopping a bullet from reaching a wearer's body, a piece of body armor must protect against blunt trauma caused by the force of the bullet. In use, body armor deforms substantially from a non-penetrating bullet impact. The bullet drives the wearer-side surface of the armor against the body at the point of impact. Unlike a penetrating wound, in which the skin is broken and the bullet tears through the body, the deformation of armor from bullet impact results in blunt trauma. This type of nonpenetrating injury can cause severe contusions, internal injury and, in severe cases, death.

Figure 19:
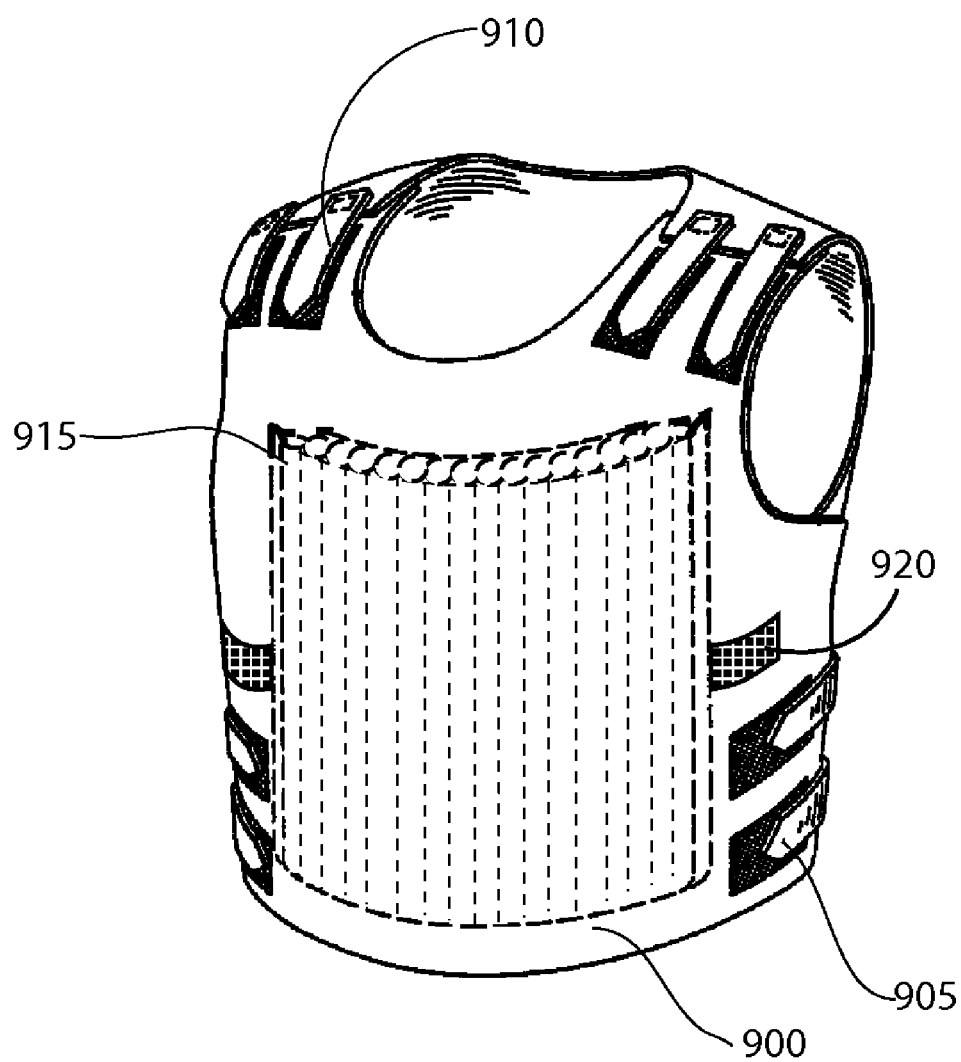
FIG. 19 is a perspective view of an exemplary vest (e.g., an armored vest) that includes a trauma reducing backing pad that is disposed between the interior surface of the vest and the wearer and that contains a three-dimensional fabric matrix according to principles of the invention.

FIG. 19 provides a perspective view of body armor 900 equipped with a 3D fabric matrix backing 915. Fasteners (e.g., hook and loop strips) 905 are provided to close the vest. The 3D fabric matrix backing 915 may be an integral part of the vest, an insert or a pad attached to the wearer's garments or to the vest. By way of example, hook and loop fasteners 920 may be provided to attach the pad to the wearer's garment or to the surface of the vest facing the wearer. As discussed below, the 3D fabric matrix backing 915 reduces blunt trauma. A person wearing body armor will still feel the energy of a bullet's impact, of course, but distributed over a relatively large region of the body rather than concentrated in a specific area.

Figure 20:
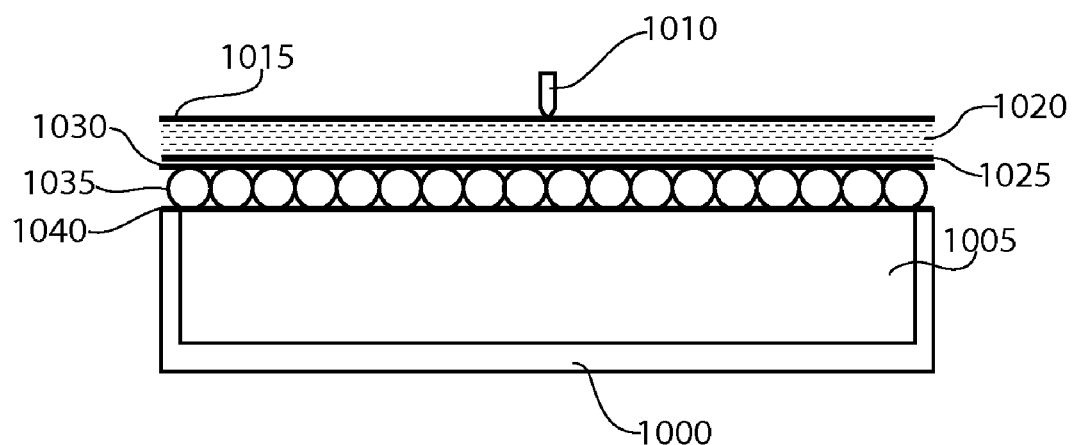
FIG. 20 is a schematic of an exemplary clay ballistic testing apparatus with material for a vest (e.g., an armored vest) and a trauma reducing backing pad disposed between the vest material and the test apparatus.
Figure 21:
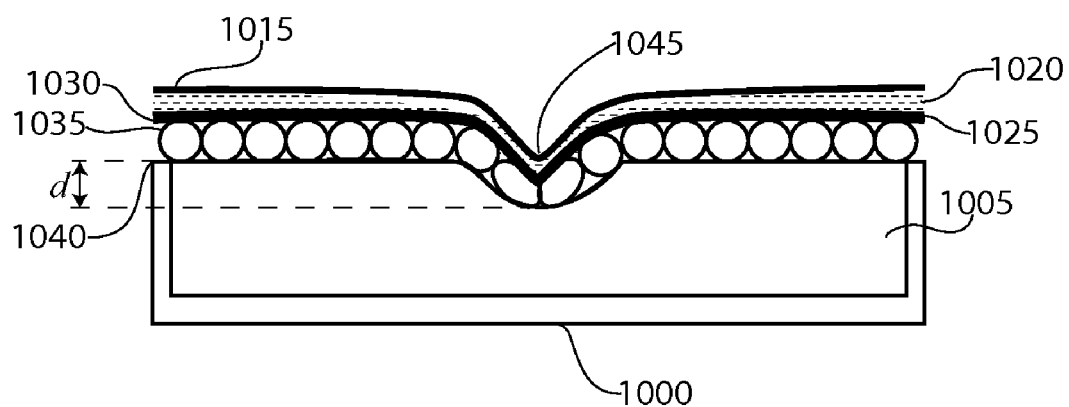
FIG. 21 is a schematic of the exemplary clay ballistic testing apparatus shown in FIG. 20 after impact by a bullet.

Backface signature (BFS) is a measure of the depth of deflection of body armor due to a bullet impact. BFS is a measure of how much impact the bullet leaves on the substance under the armor once the armor stops the round from penetrating. It indicates the potential blunt trauma experienced by the body underneath the armor. As conceptually illustrated in FIGS. 20 and 21, BFS is typically measured in a lab by creating a bed of clay called backing 1005 held in a box-like frame 1000 with an open face. The armor being tested, which includes a multilayer protective panel 1020 sandwiched between outer 1015 and inner 1025 fabric layers. To determine the effect that a 3D fabric matrix backing has on backface signature, a pad comprising a 3D fabric matrix 1035 sandwiched between outer and inner fabric layers 130, 140, is sandwiched between the vest and backing 1005. Optionally, the pad may be comprised of multiple stacked layers of 3D fabric matrix. Hook and loop fasteners may be used to secure the pad to the vest. Alternatively, the sandwiched pad may be held in place by friction.

A round 1010 fired into the armor creates an indentation 1045 which extends into the backing material. The depth, d, of the indentation in the backing material is measured and recorded as the BFS. To meet industry standards, armor must not allow an indentation greater than a determined limit. By way of example and not limitation, U.S. Department of Justice, Office of Justice Programs, National Institute of Justice (NIJ) Standard-0101.06, entitled Ballistic Resistance of Body Armor specifies that either all measured BFS depths due to fair hits shall be 44 mm (1.73 in) or less, or if any BFS depth exceeds 44 mm (1.73 in) then there shall be 95% confidence that 80% of all BFS depths will be 44 mm (1.73 in) or less; and in no case may a BFS depth exceed 50 mm (1.97 in).

Figure 22:
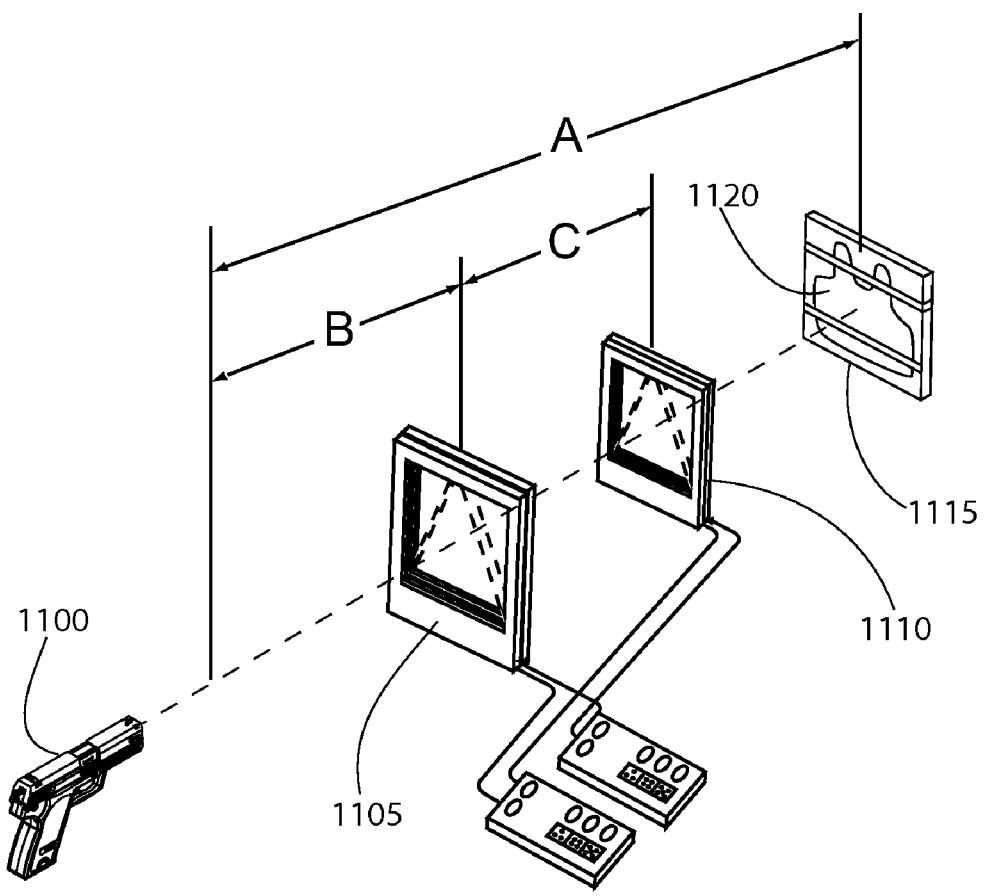
FIG. 22 is a schematic of an exemplary ballistic testing system including a clay ballistic testing apparatus according to FIG. 20.

As illustrated in FIG. 22, BFS testing entails aiming a firearm 1100 at an armor assembly (e.g., vest with 3D fabric matrix backing 1120) attached to the clay backing assembly 1115. The firearm 1100 fires series of rounds (e.g., a six-shot sequence) at armor attached to backing The armor and backing are placed a determined distance, A (e.g., 17.2 ft) from the firearm 1100. Bullet velocity, $V_1$ and $V_2$, is measured using chronographs, such as a pair of chronographs positioned in the line of flight at determined distances (e.g., B=6.5 ft., C=11.5 ft.) from the firearm 1100. Deformation of the clay backing behind the impacted armor is measured to determine BFS. Each shot targets a different part of the armor and backing The armor is smoothed out, or patted down, after each shot. The clay backing is restored to its original level surface between shots.

The tables shown in FIGS. 23 and 24 provide results of BFS testing according to the procedure described above for baseline armor without the 3D fabric matrix backing 915 and for armor with the 3D fabric matrix backing 915, respectively. The tested armor was a 28-ply aramid vest. A 3D matrix comprising a Nicolon® 3-D core with a plurality of substantially vacuous, porous, resilient, load-bearing, plastic tubular formations was tested. Each tubular formation has a diameter of about 0.5 inches (per layer) and is formed from plastic (e.g., olefin) yarns about 250 mil thick. Peripheral edges of the pair of coterminous plastic fabric layers of the matrix were joined together as described above. A strip of thin flexible material (e.g., PVC) was wrapped over and joined to the joined edges of the pair of coterminous plastic fabric layers, as also described above. The tested matrix with the joined together and covered edges was contained in a fabric enclosure. The ammunition was a Remington® 9 mm, 124-grain round, full metal jacket, with Accurate® double base, ball propellant powder No. 5. The rounds were fired directly at the armor, with the line of flight being substantially perpendicular to the plane of the armor (i.e., obliquity=0°). $T_1$ is the time of flight in µs from the firearm to the first chronograph 1105. $V_1$ is the corresponding velocity of the round at the first chronograph 1105. $T_2$ is the time of flight in /is from the firearm to the second chronograph 1110. $V_2$ is the corresponding velocity of the round at the second chronograph 1110. $V_A$ is the average velocity. $V_S$ is the estimated striking velocity.

As shown in the tables of FIGS. 23 and 24, the tests reveal a significant reduction in deformation, d, when the 3D fabric matrix backing is used. Without the 3D fabric matrix backing, the average deformation was 32 mm. With the 3D fabric matrix backing the average deformation was about 23 mm, which is approximately a 28% reduction in deformation. This reduction in deformation represents a substantial decrease in the severity of blunt trauma injuries and recovery time, while increasing the defensive and operational capabilities of a wearer. Additionally, at relatively little additional cost and weight, the 3D fabric matrix backing helps achieve compliance with European standards, which generally allow up to about 25 mm of backface signature.

Another application for a 3D fabric matrix pad is a recoil cushion. When a round is fired from a shoulder firearm, such as a shotgun or rifle, a recoil force is transmitted rearward through the stock into the user's shoulder. With continuing attempts to increase the size, velocity and range of projectiles while flattening trajectories, muzzle energy and recoil has increased. A pad containing a 3D fabric matrix according to principles of the invention may be contained in a pocket at the shoulder of a garment worn by hunters to absorb and distribute recoil energy. Alternatively, such a pad may be contained in a fabric enclosure and releasably or permanently attached to the interior or exterior surface of the shoulder region of the garment. Releasable attachment using a hook and loop fastener allows the pad to be conveniently attached when needed and removed when not needed. Additionally, the garment may be laundered without degrading the integrity of the plastic (e.g., olefin) yarns comprising the matrix.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A contact article including a load bearing pad, said load bearing pad comprising
    a pair of coterminous plastic fabric layers, each of said plastic fabric layers having peripheral edges;
    a three dimensional plastic fabric matrix, said matrix comprising a substantially vacuous, porous, resilient, load-bearing, synthetic strand core plastic tubular formations in at least one layer sandwiched between the pair of coterminous plastic fabric layers; and
    a strip of thin flexible material wrapped over and joined to the peripheral edges of the pair of coterminous plastic fabric layers.

2. A contact article including a load bearing pad according to claim 1, the peripheral edges of the pair of coterminous plastic fabric layers being joined together to form an envelope with a compartment containing the three dimensional plastic fabric matrix, and said strip of thin flexible material being wrapped over and joined to the joined edges of the pair of coterminous plastic fabric layers.

3. A contact article including a load bearing pad according to claim 1, said peripheral edges of the pair of coterminous plastic fabric layers being joined using a joint from the group consisting of a thermal bond, a chemical bond, an ultrasonic weld, and stitching.

4. A contact article including a load bearing pad according to claim 1, wherein the strip of thin flexible material wrapped over and joined to the joined edges of the pair of coterminous plastic fabric layers is comprised of a material from the group consisting of fabric, PVC and thermoplastic film.

5. A contact article including a load bearing pad according to claim 1, wherein the strip of thin flexible material wrapped over and joined to the joined edges of the pair of coterminous plastic fabric layers is joined to the edges using a joint from the group consisting of a thermal bond, a chemical bond, an ultrasonic weld, and stitching.

6. A contact article including a load bearing pad according to claim 1, said core comprising a plurality of substantially vacuous, porous, resilient, load-bearing, plastic tubular formations in at least one layer, each tubular formation in the at least one layer having a diameter at least about 0.2 to 0.75 inches.

7. A contact article including a load bearing pad according to claim 1, said core comprising a plurality of substantially vacuous, porous, resilient, load-bearing, plastic tubular formations in at least one layer, each tubular formation in the at least one layer having a diameter at least about 0.2 to 0.75 inches, and said tubular formations being formed from olefin yarns.

8. A contact article including a load bearing pad according to claim 1, said core comprising a plurality of substantially vacuous, porous, resilient, load-bearing, plastic tubular formations in at least one layer, each tubular formation in the at least one layer having a diameter at least about 0.2 to 0.75 inches, and said tubular formations being formed from olefin yarns, said yarns being about 250 mil thick.

9. A contact article including a load bearing pad according to claim 1, said core comprising a plurality of substantially vacuous, porous, resilient, load-bearing, plastic tubular formations in at least one layer, each tubular formation in the at least one layer having a diameter at least about 0.2 to 0.75 inches, and
    said tubular formations being formed from olefin yarns, said yarns being about 250 mil thick, and
    said three dimensional plastic fabric matrix experiencing about 10% compression at a load of 10 to 25 psi, determined in accordance with ASTM D3575.

10. A contact article including a load bearing pad according to claim 1, said core comprising a plurality of substantially vacuous, porous, resilient, load-bearing, plastic tubular formations in at least one layer, each tubular formation in the at least one layer having a diameter at least about 0.2 to 0.75 inches, and
    said tubular formations being formed from olefin yarns, said yarns being about 250 mil thick, and
    said three dimensional plastic fabric matrix providing an air flow of about 1000 CFM, measured in accordance with ASTM D737.

11. A contact article including a load bearing pad according to claim 1, said contact article being a garment with a pocket containing the pad, said pocket comprising a plurality of fabric layers, said pocket being positioned at an area of the garment providing thermal regulation.

12. A contact article including a load bearing pad according to claim 1, said contact article being a garment with a pocket containing the pad, said pocket comprising a plurality of fabric layers, said pocket being positioned at an area of the garment providing thermal regulation, said fabric layers including a portion of air permeable material to provide breathability.

13. A contact article including a load bearing pad according to claim 1, said contact article being a garment with a pocket containing the pad, said pocket comprising a plurality of fabric layers, said pocket being positioned at an area of the garment providing insulation, said fabric layers comprising materials that restrict air permeation.

14. A contact article including a load bearing pad according to claim 1, said contact article being a garment with a pocket containing the pad, said pocket comprising a plurality of fabric layers, said pocket being positioned at an area of the garment providing cushioning.

15. A contact article including a load bearing pad according to claim 1, said contact article being a backpack with a back configured to abut a wearer's back, and said load bearing pad being contained within a fabric envelope at the back of the backpack, said fabric envelope including an air permeable material.

16. A contact article including a load bearing pad according to claim 1, said contact article being a backpack with a plurality of shoulder straps configured to support the backpack, each of said shoulder straps having an underside configured to contact a wearer, and said load bearing pad being contained within a fabric envelope attachable to the underside of the shoulder straps, said fabric envelope including an air permeable material.

17. A contact article including a load bearing pad according to claim 1, said contact article being a ballistic vest with an interior surface configured to abut a wearer when worn, and said load bearing pad being contained within a fabric envelope at the interior surface of the ballistic vest, said fabric envelope including an air permeable material, and said load bearing pad configured to reduce the backface signature of the ballistic vest by at least ten percent.

18. A contact article including a load bearing pad according to claim 1, said contact article being a ballistic vest with an interior surface configured to abut a wearer when worn, and said load bearing pad being contained within a fabric envelope at the interior surface of the ballistic vest, said fabric envelope comprising an air permeable material, and said load bearing pad configured to reduce a backface signature of the ballistic vest by at least ten percent; and said core comprising a plurality of substantially vacuous, porous, resilient, load-bearing, plastic tubular formations in at least one layer, each tubular formation in the at least one layer having a diameter at least about 0.2 to 0.75 inches, and said tubular formations being formed from olefin yarns, said yarns being about 250 mil thick.

19. A contact article including a load bearing pad according to claim 1, said contact article being a seat pad and said pocket comprising a plurality of fabric layers.

20. A contact article including a load bearing pad according to claim 1, said contact article being a bedding article and said pocket comprising a plurality of fabric layers.

* * * * *